Figure 1:
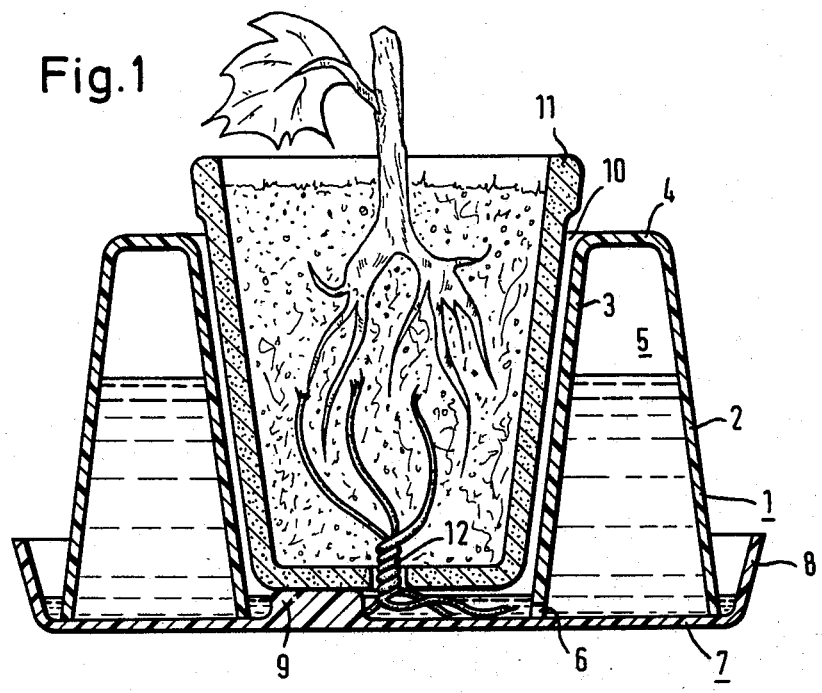

United States Patent [19]

Branković

[11] 4,083,146

[45] Apr. 11, 1978

[54] DEVICE FOR CONTINUOUSLY WATERING PLANTS IN FLOWER POTS OR BOXES

[76] Inventor: Obrad Branković, Temisvarska 12, Belgrade, Yugoslavia

[21] Appl. No.: 672,722

[22] Filed: Apr. 1, 1976

[30] Foreign Application Priority Data

Apr. 1, 1975 Yugoslavia .................. 832/75

[51] Int. Cl.² ............................................. A01G 27/00
[52] U.S. Cl. ............................................. 47/71; 47/81
[58] Field of Search .................. 47/38, 38.1, 34.2, 71, 47/81

[56] References Cited

U.S. PATENT DOCUMENTS

| 267,296 | 11/1882 | Wilder | 47/38 |
|---|---|---|---|
| 2,120,599 | 6/1938 | Brown | 47/34.2 |
| 3,534,498 | 10/1970 | Herrli | 47/38.1 |

FOREIGN PATENT DOCUMENTS

| 1,078,471 | 11/1954 | France | 47/38.1 |
|---|---|---|---|
| 1,215,887 | 4/1960 | France | 47/38.1 |
| 1,200,203 | 12/1959 | France | 47/38.1 |
| 1,243,505 | 9/1960 | France | 47/38.1 |
| 14,554 of | 1907 | United Kingdom | 47/38.1 |

*Primary Examiner*—Edgar S. Burr
*Assistant Examiner*—James R. Feyrer
*Attorney, Agent, or Firm*—Armstrong, Nikaido, Marmelstein & Kubovcik

[57] ABSTRACT

An improved device for continuously watering plants growing in flower pots or boxes, comprising a body formed by the combination of at least two shells which have a similar geometric configuration and are disposed one within the other and the side walls of which are oppositely inclined with respect to the verical direction in a manner such that they are converging toward each other from the bottom to the top thereof while the top edges of said side walls are interconnected by a generally horizontal top wall. Said shells and said top wall define a hollow space within said body while surfaces of said shells opposite the surfaces defining said hollow space are forming outer and inner walls of said body. The concentrically inner shell is provided with a series of apertures at the bottom free edge thereof. There is further provided a base having an upwardly extending rim so that the bottom edge of said outer shell is encircled by said rim and rests on the bottom of said base while also the bottom edge of said inner shell rests on the bottom of said base.

2 Claims, 5 Drawing Figures

U.S. Patent  April 11, 1978  Sheet 3 of 3  4,083,146

DEVICE FOR CONTINUOUSLY WATERING PLANTS IN FLOWER POTS OR BOXES

SUMMARY OF THE INVENTION

A device for continuously watering plants growing in flower pots or boxes, comprising a body formed by the combination of at least two shells which have a similar geometric configuration and are disposed one within the other and the side walls of which are oppositely inclined with respect to the vertical direction in a manner such that they are converging toward each other from the bottom to the top thereof while the top edges of said side walls are interconnected by a generally horizontal top wall. Said shells and said top wall define a hollow space within said body while surfaces of said shells opposite the surfaces defining said hollow space are forming outer and inner walls of said body. The concentrically inner shell is provided with a series of identical apertures at the bottom free edge thereof. There is further provided a base having an upwardly extending rim so that the bottom edge of said outer shell is encircled by said rim and rests on the bottom of said base while also the bottom edge of said inner shell rests on the bottom of said base.

This invention relates to improvements in devices for continuously watering plants, especially flowers grown in flower pots or flower boxes. This device advantageously distinguishes over the priorart devices of this type by its novel design, simple construction and in particular by ease in manufacture and by the possibility of easily nesting the devices for storage and transportation.

The device according to the invention substantially comprises a compression or injection molded piece formed as a combination of at least two shells having similar geometrical shape, both shells being formed as cone-like bodies and arranged in a reverse position alternately concentrically within each other so that a space is formed between them which downwardly increases in its cross-section or volume. At their upper portion, said shells are interconnected by a connecting surface so that said shells and said connecting surface define an inner space between themselves which can be utilized as a water reservoir. The lower end of the inner shell forming the inner wall of said molded body is provided with a plurality of small apertures or notches at the edges to permit water to flow from the inner space between the shells to the space defined by the inner shell or by the inner wall respectively. Said molded body is disposed on a base body having a flat surface which, however, in its center region within the space defined by the inner wall of the inner shell is provided with projections adapted to support a flower pot or a similar container. Self-evidently both the shape and the dimensions of the molded body depend upon the shape of the flower pot, flower box or other container and are adapted to the latter, while the volume of the inner space can be advantageously dimensioned according to the requirements of each respective plant yet in a manner such that the water supply will be at least sufficient for 30 to 40 days. When the base body is not provided with elevations, they can be replaced by special inserts while at the same time it should be ensured that their height should exceed the height of the orifices or apertures in the inner wall of the inner shell when the device according to the invention is to be used for watering plants or flowers at normal growth requirements. In the cases in which the device is used for watering plants requiring that their roots should be permanently immersed in water or plants which may or must be in a highly humid environment, said elevations or inserts may have a smaller height in comparison to the height of the apertures in the inner shell wall or may be completely omitted.

Of course these spacer elements may be arranged on the flower pot itself or on the flower container of another type so that the necessity of arranging suchlike spacers as a component of the watering means is eliminated.

A permanent water supply can be achieved by a wick having a good absorptivity, which is passed through the hole in the bottom of the flower pot and the free end of which dips into the water present on the bottom of the space defined by the wall of the inner shell when the flower pot is placed in its effective position according to the present invention. Thus, since the flower pot or flower container rests on spacers, the plant can receive as much water as is required for its growth although the bottom of the flower pot is above the liquid level.

Figure 2:
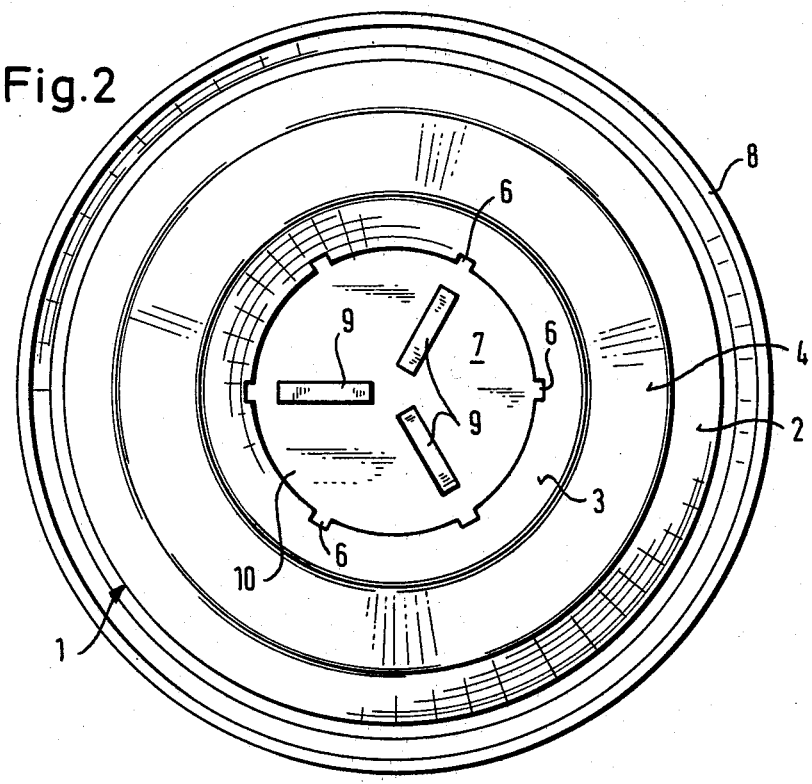
Figure 3:
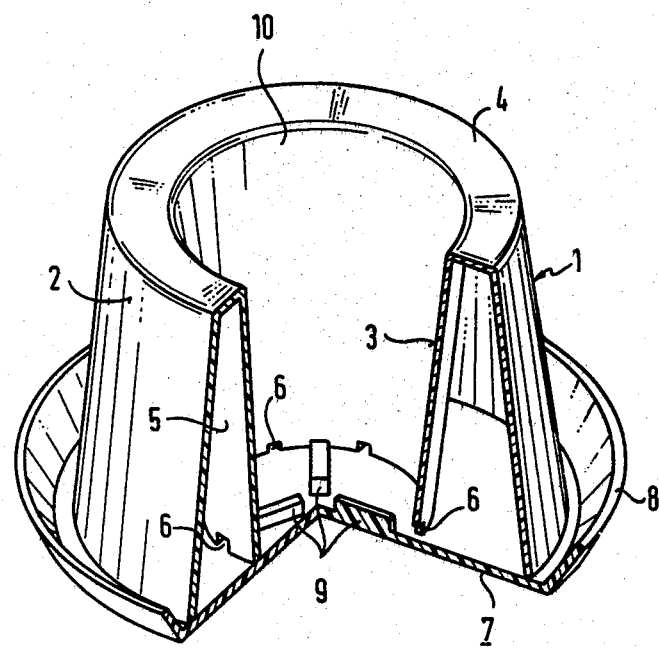
Figure 4:
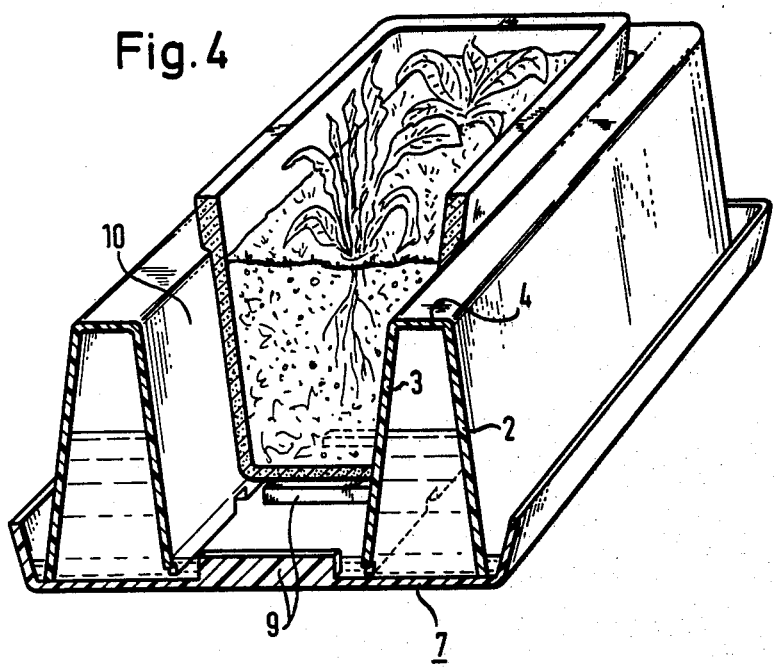
Figure 5:
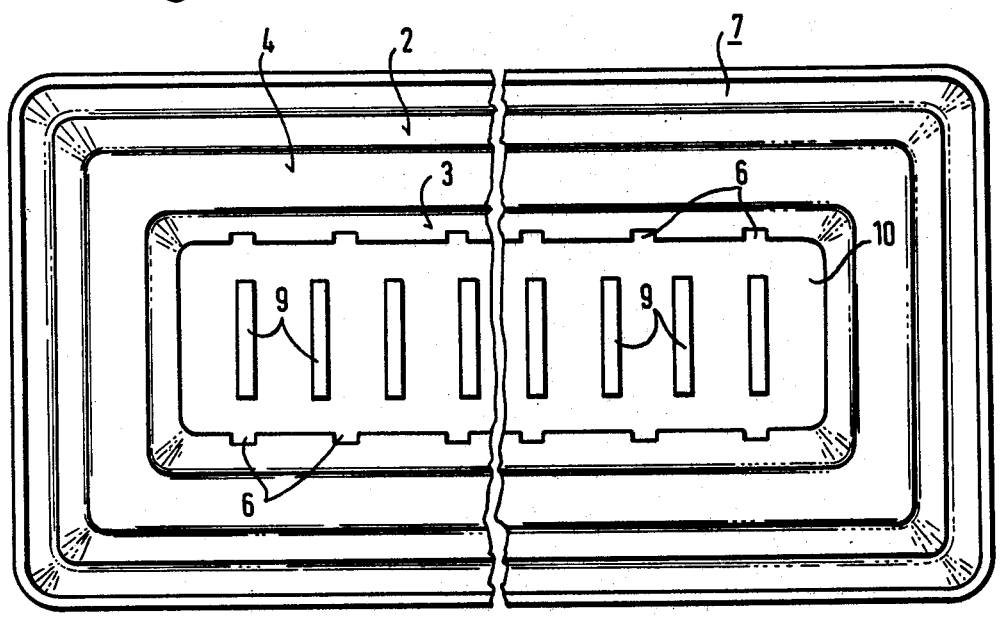

For the sake of easier comprehension of the invention, a device for permanently watering plants in flower pots or other flower containers is shown by way of example in the appended drawings, in which FIG. 1 shows a vertical sectional view of a device according to the invention together with a flower pot in a position of use, FIG. 2 shows a top plan view of the device according to FIG. 1 from which the flower pot is omitted, FIG. 3 shows a partial sectional perspective view relative to FIG. 1, and FIGS. 4 and 5 show an exemplary embodiment of the invention for a flower box.

The device according to FIGS. 1 to 3 for continuously watering plants cultivated in flower pots or flower containers comprises a molded body 1 having the shape of a hollow body containing a space between the walls, the outer wall 2 of which has the shape of a frusto-conically shaped shell while the inner wall 3 has the shape of a frusto-conically shaped shell in an inverse position relative to shell 2. The inner shell 3 in this inverse position is arranged concentrically within the inner space of the outer shell 2 and has the same height and at its upper end is connected therewith by an annular and circular surface 4. At the lower end of the molded body 1, the shells 2 and 3 have free ends so that together with the connecting surface 4 they form an inner space 5 in which the molded body 1 can receive a supply of water. The shell 3 of the molded body 1 has its lower end provided with a plurality of apertures 6 or narrow bores as water passageways.

According to the present invention, the molded body 1 is arranged on a flat circular base 7 having a diameter slightly greater than the diameter of the outer shell 2. The base 7 furthermore at its outer circumference is provided with an upwardly bent peripheral edge 8 while within the range of the base 7 surrounded by shell 3 a plurality of radially spaced spacers 9 rectangular or frusto-conical in cross-section are arranged in approximately equal angles. The height of spacers 9 is advantageously greater than the height of the apertures 6 when the device according to the present invention is to be used for plants requiring normal cultivation conditions.

A flower pot 11 is arranged in the conical space 10 formed by the molded body 1 and the base 7 so that the flower pot rests on the spacer 9 while an optionally provided suction wick 12 projects directly into the flower pot and at its lower end freely rests on the base surface of base 7.

The device according to the invention is used in a manner such that the molded body 1 is turned upwards whereupon its inner space 5 is filled with water. Thereafter, the base 7 is put onto the molded body 1 and firmly pressed against the molded body, whereupon the whole device is turned into its position for use. The device is now ready for use because immediately after the device has been turned into its position for use a layer of water is formed at the bottom of space 10 as a consequence of the water passage through the apertures 6. As soon as from this layer an amount of water is consumed such that the water level clears the apertures 6 so far that air can enter through said apertures into space 5, a corresponding water amount flows from space 5 through the apertures 6. When a flower pot 11 is put into a device constructed in such a manner and when a wetting wick at its free end is immersed into the water within the range of the bottom of space 10, a normal water supply to the plant in the flower pot 11 is achieved by the suction effect by wick 12. As already mentioned before, the water stored within the hollow space 5 of the molded body 1 suffices for 30 to 40 days for normal water consumption of the plant while at the same time the bottom of the flower pot is always dry yet the plant absorbs as much water as necessary. In the embodiment of the invention according to FIGS. 4 and 5 for use for plants growing in flower boxes, the molded body is formed rectangular in one longitudinal direction while its outer walls have the shape of a truncated pyramid having a rectangular bottom. The inner shell 3 does also have the form of a truncated pyramid fitted into shell 2 in inverse position. Both shells 2 and 3 in turn are interconnected by a connecting surface 4 at their upper end while the base 7 has rectangular shape too. Spacers 9 in this modified embodiment are distributed over the surface of base 7 parallel and in right angle to the centerline of the device while the lower portion of the inner space 10 can receive the flower box. Also in this modified embodiment, the device according to the invention functions in the same manner as the device described hereinbefore.

It is to be understood that the device according to the invention can be also used for plants and flowers requiring that their roots should permanently dip into water or requiring a permanently humid environment; in such a case, the spacers 9 are of lower height than the apertures 6 or are completely eliminated.

The device according to the invention consists of only two parts which are simply constructed and simply to manufacture. In particular, not only the cup-shaped base 7 but also the molded body 1 can be readily compression or injection molded from synthetic material because its inner and outer walls formed by shells 2 and 3 extend in an angle relative to each other, which gives no rise to difficulties during compression and injection molding the molded piece forming the inner space 5 when the finished workpiece is to be withdrawn from said inner space. For transportation and storage purposes, both the base 7 and the molded body 6 can be readily nested.

All of the technical details elucidated in the above description and shown in the drawing Figures are of importance for the invention.

I claim:
1. A device for continuously watering plants growing in a flower pot, said device comprising:
   a body consisting of an outer side wall in the shape of a truncated cone, an inner side wall in the shape of a truncated cone, wherein the inner side wall is positioned within the outer side wall and the inner and outer side walls are sloped in opposite directions with respect to the vertical, such that they converge towards each other at the top of the body, the inner side wall having at least one hole in the bottom edge thereof, and a top wall extending between the top edges of the inner and outer side wall, wherein a hollow space with an open bottom is defined by the inner and outer walls and the top wall; and
   a base consisting of a base plate having a diameter greater than the diameter of the bottom edge of the outer side member, a rim extending upward from the edge of the base plate, and a plurality of mounting spacer means extending upward from the base plate for supporting a flower pot thereon, said spacer means being the sole support for said flower pot, the height of the spacer means being greater than the height of the at least one hole in the bottom edge of the inner side wall, wherein the body is positioned on the base plate such that the bottom thereof is between the rim and the plurality of spacer means of the base.

2. A device for continuously watering plants growing in a flower pot, said device comprising:
   a body consisting of an outer side wall in the shape of a rectangular base truncated pyramid, an inner side wall in the shape of a rectangular base truncated pyramid, wherein the inner side wall is positioned within the outer side wall and the inner and outer side walls are sloped in opposite directions with respect to the vertical, such that they converge towards each other at the top of the body, the inner side wall having at least one hole in the bottom edge thereof, and a top wall extending between the top edges of the inner and outer side walls, wherein a hollow space with an open bottom is defined by the inner and outer walls and the top wall; and
   a base consisting of a base plate having a rectangular shape of greater size than the base of the outer side member, a rim extending upward from the edge of the base plate, and a plurality of mounting spacer means extending upward from the base plate for supporting a flower pot thereon, said spacer means being the sole support for said flower pot, the height of the spacer means being greater than the height of the at least one hole in the bottom edge of the inner side wall, wherein the body is positioned on the base plate such that the bottom thereof is between the rim and the plurality of spacer means of the base.

* * * * *